United States Patent
Gienger et al.

(10) Patent No.: US 8,571,714 B2
(45) Date of Patent: Oct. 29, 2013

(54) ROBOT WITH AUTOMATIC SELECTION OF TASK-SPECIFIC REPRESENTATIONS FOR IMITATION LEARNING

(75) Inventors: Michael Gienger, Muhlheim (DE); Manuel Muehlig, Gera (DE); Jochen Steil, Bielefeld (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 763 days.

(21) Appl. No.: 12/709,814

(22) Filed: Feb. 22, 2010

(65) Prior Publication Data

US 2010/0222924 A1 Sep. 2, 2010

(30) Foreign Application Priority Data

Feb. 27, 2009 (EP) .................................. 09153866

(51) Int. Cl.
 *B25J 13/08* (2006.01)
 *B25J 19/04* (2006.01)
(52) U.S. Cl.
 USPC ...................... 700/258; 700/264; 318/568.16
(58) Field of Classification Search
 USPC ......... 700/245, 259, 254, 258, 264, 250, 257, 700/261, 160; 707/100; 318/568.22, 572, 318/571, 568.12, 568.16; 451/38, 177
 See application file for complete search history.

(56) References Cited

U.S. PATENT DOCUMENTS

| | | | |
|---|---|---|---|
| 2004/0006566 A1* | 1/2004 | Taylor et al. | 707/100 |
| 2007/0239641 A1 | 10/2007 | Ito et al. | |
| 2007/0255454 A1* | 11/2007 | Dariush | 700/245 |
| 2008/0249659 A1* | 10/2008 | Ueyama | 700/245 |
| 2008/0258670 A1* | 10/2008 | Yoshikawa | 318/568.22 |
| 2008/0312771 A1* | 12/2008 | Sugiura | 700/259 |
| 2009/0118864 A1* | 5/2009 | Eldridge et al. | 700/259 |

FOREIGN PATENT DOCUMENTS

| | | |
|---|---|---|
| EP | 1 074 352 | 2/2001 |
| EP | 1 537 959 | 6/2005 |

OTHER PUBLICATIONS

Toussaint et al., "Optimization of sequential attractor-based movement for compact behaviour generation", 2007 7th IEEE-RAS international conference, Humanoids, Nov. 29, 2007, pp. 122-129.
EP Communication, European Search Report, Jan. 14, 2010, a total of 5 pages.

* cited by examiner

*Primary Examiner* — Ronnie Mancho
(74) *Attorney, Agent, or Firm* — Squire Sanders (US) LLP

(57) ABSTRACT

The invention proposes a method for imitation-learning of movements of a robot, wherein the robot performs the following steps:
 observing a movement of an entity in the robot's environment,
 recording the observed movement using a sensorial data stream and representing the recorded movement in a different task space representations,
 selecting a subset of the task space representations for the imitation learning and reproduction of the movement to be imitated.

11 Claims, 2 Drawing Sheets

Figure 1:
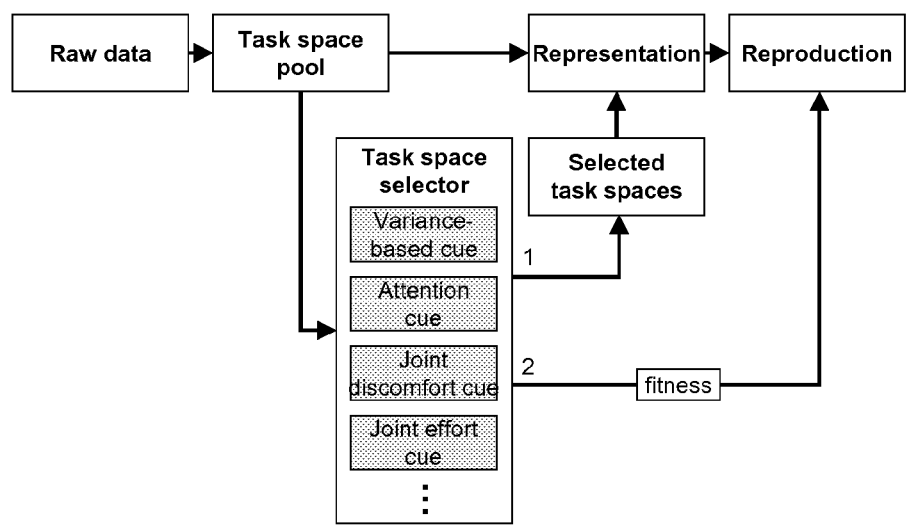

ROBOT WITH AUTOMATIC SELECTION OF TASK-SPECIFIC REPRESENTATIONS FOR IMITATION LEARNING

FIELD OF INVENTION

The invention generally relates to the field of autonomous robots. The invention also refers to a method to enhance the process of imitation learning with robots.

The invention provides a mechanism for the autonomous selection of suitable task-specific representations of movement-imitation data and therefore increases the autonomy of such systems. The autonomous selection can be driven by multiple integrated cues, such as statistical decision making, interaction with the teacher, but also model-based a priori knowledge.

"Imitation learning" is a term well understood by the skilled person in the field of autonomous robots. An introduction can be found in chapter 6.12 of Bekey "Autonomous robots", The MIT press, 2005.

OBJECT OF THE INVENTION

It is the object of the present invention to render more efficient a robot's imitation learning of a movement.

This object is achieved by means of the features of the independent claims. The dependent claims develop further the central idea of the present invention.

According to a first aspect the invention proposes a method for imitation-learning of movements of a robot, wherein the robot performs the following steps:
- observing a movement of an entity in the robot's environment,
- recording the observed movement using a sensorial data stream and representing the recorded movement in different task space representations,
- selecting a subset of the task space representations for the imitation learning and reproduction of the movement to be imitated.

The step of selecting a subset of the task space representations may use cues which the robot extracts from the sensorial data stream.

The step of selecting a subset of the task space representations may use the variance over multiple demonstrations of the movement, wherein task space representations in which the observations have the lowest inter-trial variance are chosen.

The step of selecting a subset of the task space representations may use attention-based methods.

The step of selecting a subset of the task space representations may use the kinematic or dynamic simulation of the human teacher.

Task elements for the selection step can be defined through discomfort, such as e.g. deviation from a default posture, and effort, such as e.g. based on the torque of effector joints, of the teacher during the task demonstration.

The task space selection may influence the movement reproduction process on the robot.

The invention also relates to a computer program product, executing a method as defined above when run on a computing device of a robot.

The invention furthermore relates to a robot, preferably a humanoid robot, having a computing unit designed to perform such a method.

The robot may be an industrial robot, which learns certain sequences of working steps by imitation learning.

Further advantages, objects and features of the invention will become evident for the skilled person when reading the following detailed description of preferred embodiments of the present invention when taken in conjunction with the only figure of the enclosed drawings.

Figure 2:
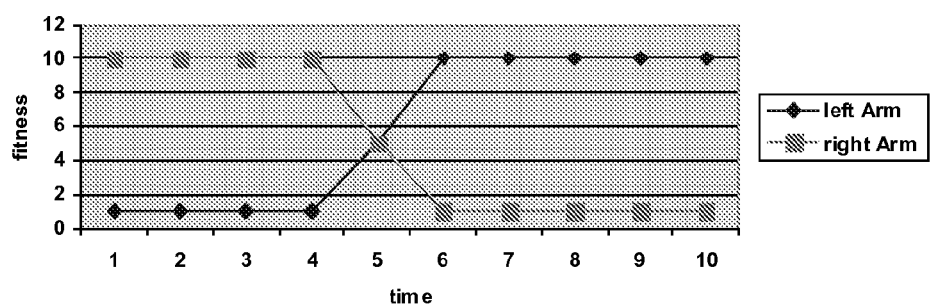

FIG. 1 shows a task space selection unit, which is part of a computing unit of a robot and FIG. 2 shows fitness values that represent the importance of the specific task space.

DETAILED DESCRIPTION OF EMBODIMENTS

When a robot with a high number of degrees of freedom, such as a humanoid robot (see chapter 13 of Bekey), e.g. Honda's ASIMO robot, or an industrial robot, shall learn new movements by observing, recording and then imitating an entity in its environment (i.e. the space covered by e.g. visual sensor of the robot), such as e.g. a human teacher, a task-specific representation within so-called task spaces is proposed. The task-specific representation reduces the dimensionality of the data to learn, eases the correspondence problem and allows additional generalization.

The present invention provides mechanisms to autonomously (i.e. performed by a computing unit of the robot) select such task spaces by regarding multiple cues of different character.

The selection according to the invention is performed out of a plurality of task spaces which represent states of the robot and the environment in different coordinate systems.

"Cues" are selection criteria which the robot extracts from the sensorial input during a imitation-learning session.

With reference to FIG. 1 now the imitation learning process together with an automatic task space selection unit will be explained. The task space selection unit is a logical unit in a computing unit of the robot.

The movement that shall be learned is demonstrated by a teacher or another entity in the robot's environment (e.g. other robots, animals, . . . ). The robot observes the demonstrated movement using sensor means, such as e.g. a video camera, which sensor means supply a data stream to the computing unit of the robot.

The data stream of the observed demonstrated movement is recorded as "Raw data" in data storage means which are connected to and accessed by the robot's computing unit.

E.g. motion capture or vision-based techniques, like color-tracking may be used for recording the observed demonstrated movement.

This "Raw data" is then projected into (i.e. represented in) different possible task spaces which are subsumed in the "Task space pool". The task space pool can be pre-set by programming or set up autonomously by the robot, e.g. in a preceding learning step.

Possible task space representations (coordinate systems) for e.g. a grasping task can be:
- absolute position of a robot's end effector,
- relative position of the robot's end effector wrt. the object that should be grasped,
- orientation of the robot's end effector, and
- if the robot is two-handed, also both hand positions may be controlled Within known imitation learning approaches, either all of these task spaces are used to represent the learned task or a subset of them is chosen manually that fits best to the task. This manual intervention strongly limits the open-endedness and the interactive capabilities of the whole imitation learning framework.

With this invention in contrast, the "Task space selector" unit of the robot does this automatically. There are two ways how the task space selector unit influences the imitation learning process:

First (1), a subset of task space representations are selected from the "Task space pool" and all other task spaces are discarded. The selection can be carried e.g. based on selection criteria (called "cues" in the following") preferably extracted from the sensorial data stream. Therefore only actually useful (as expressed by the selection criteria) task spaces are represented and later reproduced by the robot, while the remaining task spaces can be discarded.

Once a movement to be imitated has been learned, preferably an optimization method is applied on the different task space representations in order to efficiently (in terms of the robot's constraints) reproduce the learned movement. Hence, second (2), the "Task space selector" unit can influence the "Reproduction" of the movement with the help of fitness values. The fitness is a weighted combination of what the different cues "believe" to be important, therefore, fitness can be based e.g. on:
inter-trial variance
discomfort
joint torque
attention signal Before the robot is able to reproduce a learned movement, this movement can be optimized wrt. different criteria. These criteria may be e.g. self-collision avoidance, avoiding the joint limits, holding balance or fulfilling additional tasks such as always gazing at a specific position while performing the movement. This optimization can be performed e.g. using an evolutionary algorithm, wherein a fitness function ("cost function") assesses the quality ("fitness") of different movements in terms of e.g. these criteria and outputs corresponding fitness values.

Based on the information from the different cues, the task space selector generates fitness values for all task spaces that are used for the movement representation over all timesteps of the movement. Example (see FIG. 2): A gesture should be learned that involves the right hand during the first part of the movement and the left hand during the second part only. For this, maybe two task spaces are chosen for the representation, one for the left hands position and one for the right. For both of these task spaces, the task space selector generates fitness values that represent the importance of the specific task space. The movement optimization uses these fitness values to blend both task representations in order to produce a correct outcome.

During the reproduction, task spaces may be blended based on e.g. importance criteria, i.e. not only a single representation but a weighted blend of task space can be used. Different task space representations can be used sequentially when carrying out a learned movement.

The cues that are involved within the "Task space selector" unit can have very different characteristics, such as:
  A variance-based measure that assigns a high importance of a specific task space if the inter-trial variance over several task demonstrations is low. In [2], the basic idea of using the variance as an importance measure was successfully evaluated. As to this aspect, the disclosure of [2] is incorporated herewith by reference.
  An interactive cue that incorporates information about the teacher's behavior. Importance is defined through explicit attention generation by the teacher. In [3], experiments in the domain of parent-infant research, show such attention mechanisms for defining importance. As to this aspect, the disclosure of [3] is incorporated herewith by reference.
  A kinematic or dynamic simulation of a human model that is used to analyze the discomfort and effort of the human demonstrator. Uncomfortable postures that the human went through are likely to be important for the task. Prior art [4] uses similar cost functions for predicting human postures, instead of analyzing them with the goal of defining task importance for imitation. As to this aspect, the disclosure of [4] is incorporated herewith by reference.

EXAMPLE 1

Task Spaces for Moving Objects

In this example the robot shall learn to put an object (e.g. a ball) into a basket. For this, a human teacher shows the robot a set of demonstrations how to perform the task in situations with different starting positions for ball and basket. Possible task spaces in the "Task space pool" are:
  absolute position of the ball,
  absolute position of the basket,
  relative position of the ball wrt. the basket
  additional task spaces because of maybe other objects in scene (e.g. position of the ball wrt. any other recognized object)

In this example, two elements of the "Task space selector" are used in order to automatically determine the task spaces that should be used for representing the task.

First, the interactive cue signalizes that the important object that should be moved is the ball. This results from the teacher actively shaking the object to generate attention. It already limits the set of task spaces strictly to only those that are related to the ball.

Next, the statistical evaluation can decide further which of these ball-related task spaces are important, because the teacher demonstrates the task several times under different conditions. The idea of the statistical evaluation is that important aspects of a task have a low inter-trial variance over multiple demonstrations. This also applies to this example, because the evaluation will show that the use of the absolute position of the ball is very variant. However, the position of the ball in relation to the basket will be less variant and would result in a better representation.

The "Task space selector" decides on using the relative position of ball and basket as the "Selected task space" and directly influences the "Representation".

In cases where the decision between different task spaces is not easy, the "Task space selector" may also decide to represent more than one. Then, by using the fitness values (e.g. variance information from the statistical evaluation, attention signal from the interactive cue), these task spaces can be blended or deactivated during the movement reproduction.

EXAMPLE 2

Task Spaces for Gestures

This example explains the use of a kinematic simulation of a human model for deciding on task-relevant movements of distinct body parts. A humanoid robot shall learn to reproduce gestures with either one or both arms. Therefore, the main question in this example is which arm is involved in the gesture to learn. Using a statistical evaluation only, like in the previous example, is not enough to answer this question. This is because if the movement is performed with one arm, the other arm will remain still. This would result in low inter-trial variance over multiple demonstrations. However, the stillness of the uninvolved arm shouldn't be part of the representation. On the other hand, holding an arm still doesn't necessarily mean that it is unimportant.

To overcome those problems a model-based cue is used within the "Task space selector". The observed motion of the human teacher is mapped onto a human model within a kinematic simulation. Based on this model, different cost functions are evaluated. An effort value for each arm is calculated that is based on the torque of all arm joints. And the discomfort is estimated, which increases if the deviation of the human's posture from its idle position gets larger.

Using these two measures, the "Task space selector" is able to robustly decide on which arm is involved in the demonstrated gesture and to choose the representation accordingly.

References

[1] M. Toussaint, M. Gienger and C. Goerick, "Optimization of sequential attractor-based movement for compact behaviour generation" 7th IEEE-RAS International Conference on Humanoid Robots (Humanoids 2007), 2007
[2] M. Mühlig, "Task learning of bimanual object handling", diploma thesis, 2008
[3] Y. Nagai and K. J. Rohlfing, "Parental Action Modification Highlighting the Goal versus the Means", in Proceedings of the IEEE 7th International Conference on Development and Learning (ICDL'08), August 2008.
[4] K. Abdel-Malek, J. Yang, Z. Mi, V. Patel and K. Nebel, "Human Upper Body Motion Prediction", Applied Simulation and Modelling, 2004

| Glossary | |
|---|---|
| Effector | The part of the robot that is being controlled. This can e.g. be the hand or the head |
| Task vector | A vector that comprises the variables that are controlled. For a humanoid robot, this can e.g. be the hand position or the gaze direction of the head. |
| Degrees of freedom | The degrees of freedom are a minimal set of coordinates that allow the system to move. They can be controllable (like driven joints of a robot) or uncontrollable. |
| Configuration space | Space spanned by the degrees of freedom |
| Joint space | This term is often used in robotics and means configuration space |
| Task space | The space that is described by the task vector. If e.g. the hand position of a robot in x-, y- and z-direction is controlled, the task space has the dimension 3 and is spanned by these coordinates. |

The invention claimed is:

1. A method for imitation-learning of movements of a robot, the method comprising:
observing a movement of an entity in the robot's environment,
recording the observed movement using a sensorial data stream and representing the recorded movement in a plurality of task space representations,
automatically selecting, based on cues extracted from the sensorial data stream, a subset of the plurality of task space representations for the imitation learning and reproduction of the movement to be imitated, the subset comprising at least one task space representation or a sequence of different task space representations for the reproduction of the movement wherein the step of selecting a subset of the task space representations uses cues which the robot extracts from the sensorial data stream.

2. The method according to claim 1, wherein the step of selecting a subset of the task space representations uses a variance over multiple demonstrations of the movement, wherein task space representations in which the observations have a lowest variance are chosen.

3. The method according to claim 1, wherein the step of selecting a subset of the task space representations uses explicit attention generation by a human teacher.

4. The method according to claim 1, wherein the step of selecting a subset of the task space representations uses a kinematic or dynamic simulation of a human teacher.

5. The method according to claim 4, wherein task elements for the selection step are defined through discomfort of the human teacher and effort, of the human teacher during the task demonstration,
wherein the discomfort of the human teacher includes deviation from a default posture of the human teacher, and the effort of the human teacher is based on a torque of effector joint.

6. The method according to claim 1, wherein the task space selection influences the movement reproduction process on the robot.

7. The method according to claim 1, wherein an optimization method is applied on the different task space representations in order to efficiently reproduce the movement.

8. The method according to claim 1, wherein different task space representations are used sequentially over time when reproducing a learned movement.

9. A non-transitory computer readable medium for storing instructions, which, when run on a computing device of a robot, execute the method according to claim 1.

10. A robot, preferably a humanoid robot, having a computing unit designed to perform a method according to claim 1.

11. The robot of claim 10, wherein the robot is an industrial robot, which learns certain sequences of working steps by imitation learning.

* * * * *